United States Patent [19]
Frutschi et al.

[11] Patent Number: 5,271,216
[45] Date of Patent: Dec. 21, 1993

[54] METHOD FOR INCREASING THE COMPRESSOR-RELATED PRESSURE DROP OF THE GAS TURBINE OF A POWER PLANT

[75] Inventors: Hansulrich Frutschi, Riniken; Hans Wettstein, Fislisbach, both of Switzerland

[73] Assignee: Asea Brown Boveri Ltd., Baden, Switzerland

[21] Appl. No.: 9,332

[22] Filed: Jan. 25, 1993

Related U.S. Application Data

[63] Continuation of Ser. No. 716,246, Jun. 17, 1991, abandoned.

[30] Foreign Application Priority Data

Jun. 19, 1990 [CH] Switzerland ............ 2038/90

[51] Int. Cl.$^5$ .................................. F02C 3/30
[52] U.S. Cl. ...................... 60/39.05; 60/39.58; 60/726
[58] Field of Search ............ 60/39.05, 39.58, 39.59, 60/39.76, 39.78, 248, 269, 726

[56] References Cited

U.S. PATENT DOCUMENTS

| | | | |
|---|---|---|---|
| 2,757,509 | 8/1956 | Jendrassik | 60/269 |
| 4,102,125 | 7/1978 | Schelp | 60/39.59 |

FOREIGN PATENT DOCUMENTS

| | | |
|---|---|---|
| 560273 | 9/1932 | Fed. Rep. of Germany . |
| 648907 | 7/1937 | Fed. Rep. of Germany . |
| 1085717 | 7/1960 | Fed. Rep. of Germany . |
| 358569 | 2/1906 | France . |
| 1006585 | 4/1952 | France . |
| 1059635 | 3/1954 | France . |
| 272777 | 6/1927 | United Kingdom . |

*Primary Examiner*—Louis J. Casaregola
*Attorney, Agent, or Firm*—Burns, Doane, Swecker & Mathis

[57] ABSTRACT

In a method for increasing the compressor-related pressure drop of the gas turbine (8) of a gas turbine group with a waste-heat steam generator (13) connected downstream, an injector (5), through the mixing nozzle of which the precompressed air (4) from the compressor (2) flows, acts directly upstream of the gas turbine (8). At least part of the steam (10) produced in the waste-heat steam generator (13) is admitted to the driving nozzle of the injector (5), as a result of which the compressor air (4) is further compressed without consumption of power from the yield of the gas turbine (8).

3 Claims, 3 Drawing Sheets

METHOD FOR INCREASING THE COMPRESSOR-RELATED PRESSURE DROP OF THE GAS TURBINE OF A POWER PLANT

This application is a continuation of application Ser. No. 07/716,246, filed Jun. 17, 1991 (abandoned).

BACKGROUND OF THE INVENTION

1. Field of the Invention

The present invention relates to a method for increasing the compressor-related pressure drop in the gas turbine of a power plant in accordance with the preamble of claim 1. It also relates to power plants for the application of this method.

2. Discussion of Background

In power plants, the most important aim is, in the final analysis, the maximization of the efficiency of such a plant in order to minimize the exhaust-gas emissions. In this context, attention is drawn to the new generation of gas turbine groups, which are capable of providing efficiencies which were thought to be impossible just a few years ago. So-called combination units form a fairly mature technology. This term refers to the operational interaction of a gas turbine group with at least one steam-turbine circuit connected downstream, the exhaust gases from the gas turbine, which in themselves still have a large energy potential, being passed into a waste-heat steam generator, in which the steam required for acting on the steam turbine is generated. Such a waste-heat steam generator can be a single- or mixed-pressure apparatus; it is furthermore possible to equip the waste-heat steam generator with additional firing. According to the current state of the art, such a combination unit is capable of achieving efficiencies of well over 50%. It is evident that the trend is to attempt to further develop these fossil-fired power plants, firstly as regards better utilization of fossil reserves and secondly on the assumption that, on this basis, any advance in technology has a disproportionately beneficial effect. In gas turbine groups, a not insignificant proportion of the turbine output has to be used for driving the compressor, with the result that an increase in the pressure drop in the gas turbine, which should lead to a higher yield in terms of the efficiency of the plant and could be achieved via a higher compression of the working air in the compressor, is therefore of little or no overall benefit since this extra output from the gas turbine would be lost in the form of higher consumption of the shaft power by the compressor.

SUMMARY OF THE INVENTION

It is here that the invention intervenes. It is the underlying object of the invention, as defined in the claims, to maximize efficiency in a method of the type stated at the outset by increasing the compressor-related pressure drop in the gas turbine.

The essential advantage of the invention is to be regarded as the fact that the pressure increase in the working gas in the gas turbine of a power plant is accomplished without taking up the shaft power of the plant. Where circuit considerations may possibly impose a recompression stage in addition to the existing compressor, the yield from the gas turbine due to the inventive solution to the object is several times higher than the said power consumed by the additional compression.

A further advantage of the invention is to be regarded as the fact that the increase in efficiency is achieved both with pure gas turbine groups and with combination units; and this irrespective of whether the particular circuit has a constant-pressure combustion chamber or an isochoric combustion chamber.

Advantageous and expedient further developments of the inventive solution to the object are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
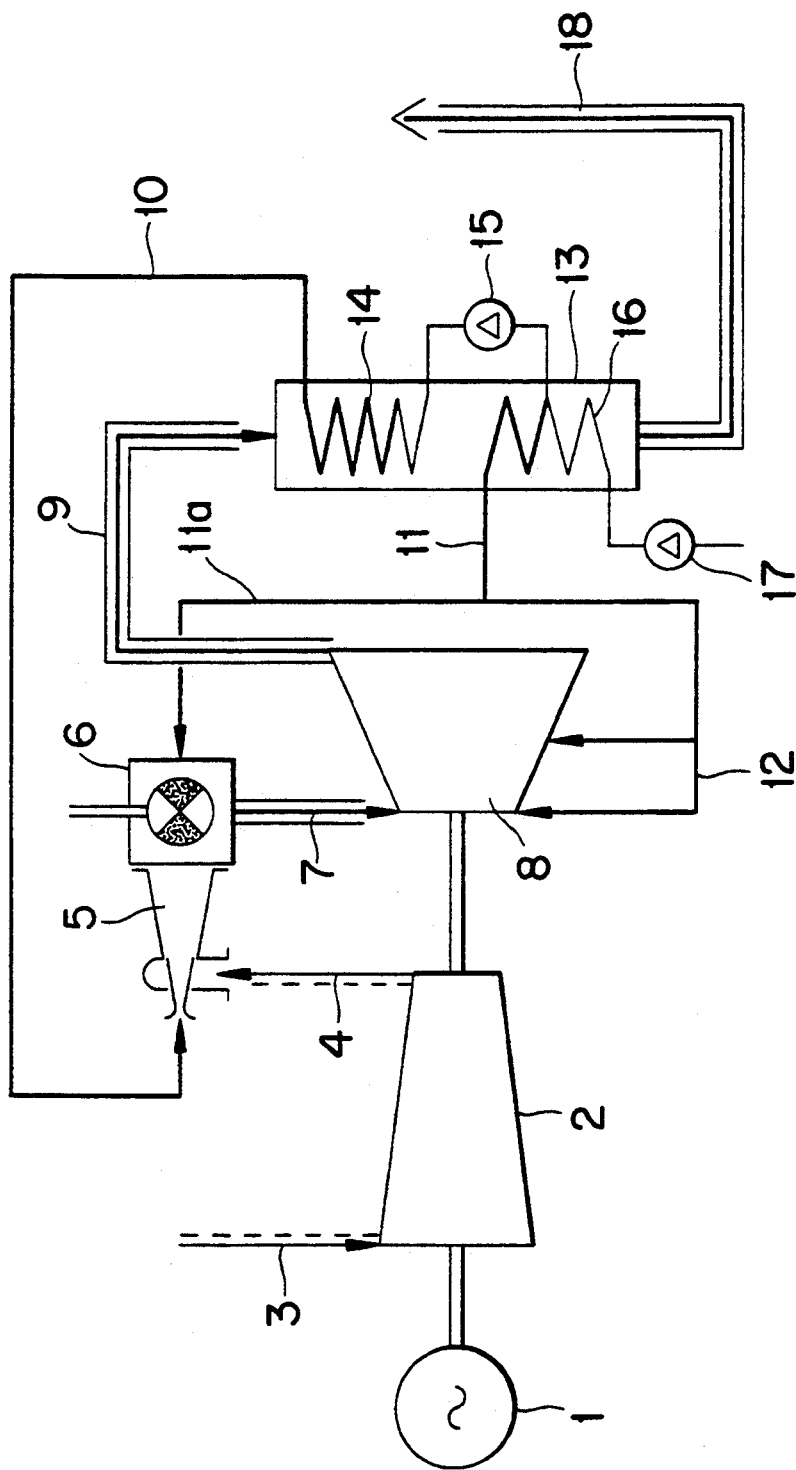
FIG. 1 shows a circuit of a gas turbine group with a waste-heat steam generator and injector.

Referring now to the drawings, wherein like reference numerals designate identical or corresponding parts throughout the several views and the direction of flow of the various media is shown by arrows, FIG. 1 shows a gas turbine group into which a waste-heat steam generator 13 and an injector 5 have been integrated. The two last-mentioned apparatuses are here in effective connection with the gas turbine group. As an autonomous unit, the gas turbine group consists, in terms of units, of a generator 1, a compressor 2, a combustion chamber 6 and a gas turbine 8. The air 3 taken in is compressed in the compressor 2 to give a precompression and then passes via the pipe 4 into the injector 5, more precisely via the mixing nozzle of the latter; the injector 5 is here placed upstream of the combustion chamber 6. The air which is then thermally prepared in this combustion chamber 6 is admitted to the gas turbine 8 as hot gas 7. The gas-turbine waste gases 9 are fed to the waste-heat steam generator 13, where further use is made of their energy. The thermal energy released from these exhaust gases is used in a high-pressure steam generating part 14 to produce a high-pressure steam 10, which is admitted to the injector 5 via its driving nozzle. Since this is a two-pressure waste-heat steam generator 13, a low-pressure steam 11 is produced in a further low-pressure steam generating part 16. Part of this steam 11a is fed to the combustion chamber 6 and there brings about, for example, a reduction in the NOx emissions. Another part of the low-pressure steam 12 acts as a coolant for the gas turbine 8. The cooled exhaust gases are then discharged into the atmosphere as flue gases 18, via a stack. A first feed-water pump 17 ensures the supply of further medium to the waste-heat steam generator 13, while a second feed-water pump 15 ensures the conveyance of the medium between the low-pressure and the high-pressure steam generating part. This circuit is thus configured in such a way that the high-pressure steam 10 produced in the waste-heat steam generator 13 is admitted to the driving nozzle of the injector 13 and has the effect that the precompressed air 4 which comes from the compressor 2 and flows into the injector 5 via the mixing nozzle is further compressed before both media 4 and 10 flow into the combustion chamber 6 placed downstream of the injector 5. As a result, the gas turbine 8 is subject to a larger pressure drop than could be built up by means of the compressor 2 alone. Thus, better use is made of the energy inherent in the steam produced in the waste-heat steam generator 13, with the result that both output and efficiency experience an increase relative to the known installations with simple steam injection. Because a high-pressure steam must be used for admission to the injector 5, it is not possible for the exhaust gases 9 from the gas turbine 8 to be used adequately in the corresponding steam generating part 14. It is therefore advantageous to place downstream of this first stage the abovementioned low-pressure steam generating part, the steam 11 of which, as likewise mentioned briefly above, is fed to the gas turbine 8 as coolant 12 and/or to the combustion in the combustion chamber 6 as a moderator medium 11 against an excessively high NOx emission. Of course, this low-pressure steam also contributes to the increasing of output and efficiency. In terms of operation, the action of the injector 5 results in the advantage that the pressure upstream of the turbine 8 rises as the steam flow 10 increases without the possibility of the back pressure of the compressor 2 rising impermissibly. A sufficiently large pumping margin of the compressor 2 is thus always guaranteed. This circuit in accordance with FIG. 1 can of course be configurated as a combination unit, in which case one part of the steam from the waste-heat steam generator 13 would be admitted to a steam turbine (not visible) connected downstream of the latter. Such an arrangement can be advantageous in conjunction with additional firing in the exhaust-gas pipe 9, or at the latest in the waste-heat steam generator 13.

Figure 2:
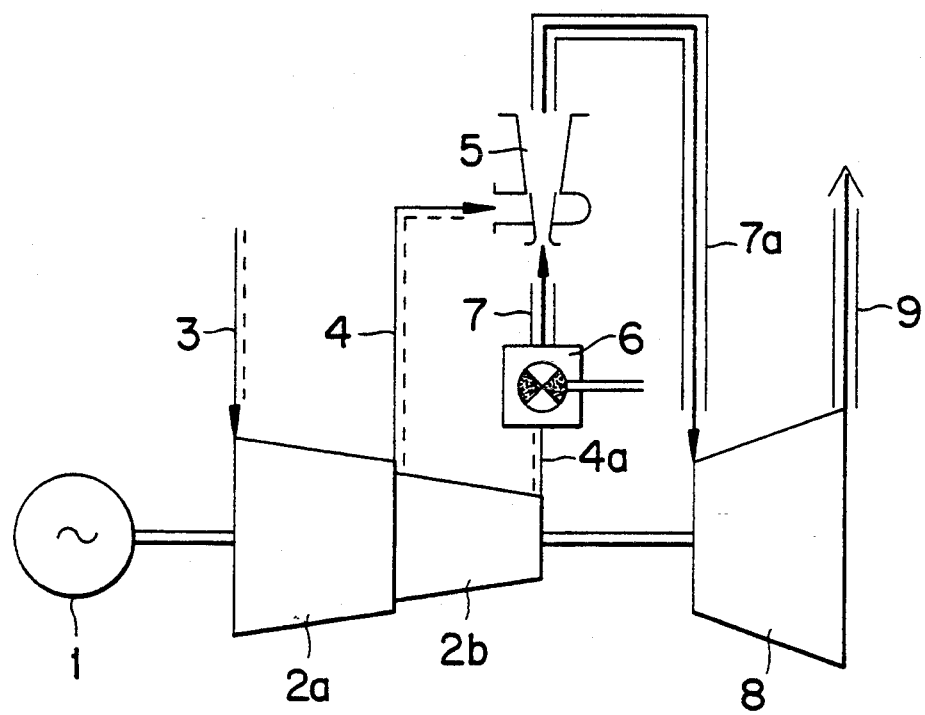
FIG. 2 shows a gas turbine group with injector and with a conventional combustion chamber.

A certain increase in efficiency and output, even if not as pronounced, can also be achieved without steam injection in a pure gas turbine group according to FIG. 2, which is per se of optimum suitability for a combination unit. For this purpose, the compressor is divided in accordance with FIG. 2 into a compressor part 2a and a compressor part 2b. The mode of operation is that the compressor part 2b takes a part-stream of the air 4a precompressed by the compressor part 2a and feeds it to a high-temperature combustion chamber 6. The relatively very high-temperature (1800° and more) and relatively high-pressure (15 bar or above) combustion gases 7 are admitted to the driving nozzle of the injector 5 and compress the precompressed air stream 4 of the compressor part 2a, flowing into the injector 5 through the mixing nozzle, to a higher final pressure than that which prevails downstream of the compressor part 2a. In the pipe 7a which leads from the injector 5 to the gas turbine 8, the mixing temperature which then results in one which is favorable for this same gas turbine 8, without significant consumption of cooling air. The advantage of this loop circuit over a simple gas turbine circuit is that the heat to be supplied can have a significantly higher temperature level, the upper temperature range assuming the further compression of the air 4 coming from the compressor part 2a, without coming into contact with rotating machines. The driving nozzle of the injector 5 does not require any special cooling since it can, for example, be manufactured from a ceramic material. In contrast to the arrangement in accordance with FIG. 1, with a steam-jet injector, which manages with components corresponding to the current state of the art, an arrangement in accordance with FIG. 2, with a hot-gas jet injector, does admittedly require an advanced technology for the future. The temperature level of the propelling jet must namely be very high so that the portion of the total air quantity which must be used for the propelling jet is as small as possible. The latter point is important in order to ensure that the power consumed by the compressor part 2b remains sufficiently small, i.e. smaller than the surplus power delivered by the gas turbine 8.

Figure 3:
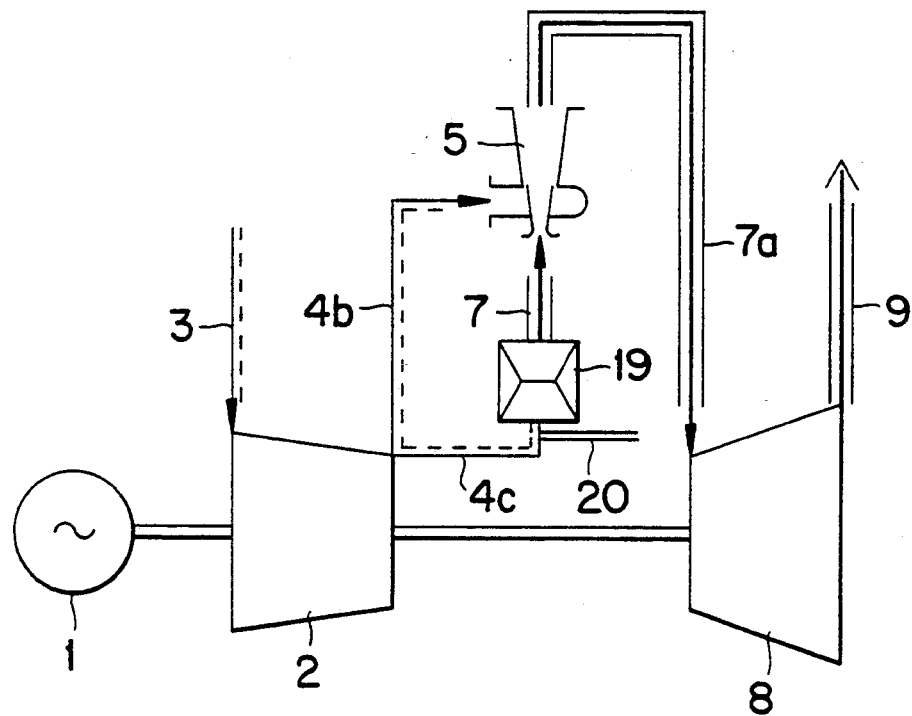
FIG. 3 shows a gas turbine group with injector and with an isochoric combustion chamber and FIG. 4 shows a circuit in accordance with FIG. 3, the isochoric combustion chamber having at least one additional low-pressure output.

Compared to FIG. 2, FIG. 3 differs in that the constant-pressure combustion chamber in accordance with FIG. 2 is now replaced by an isochoric combustion chamber 19. The combustion which takes place here at constant volume results in a pressure rise. It should be noted in this context that the precompressed air from the compressor is divided: while one part 4b flows to the mixing nozzle of the injector 5, the other part 4c passes into the isochoric combustion chamber 19, the precompressed air 4c being enriched prior to the combustion process in this combustion chamber 19 with a fuel 20 to give an ignitable fuel/air mixture. The hot gases 7 are then admitted, in a manner similar to FIG. 2, to the driving nozzle of the injector 5. Here too, a mixing temperature results in the pipe 7a which leads from the injector 5 to the gas turbine 8, due to the diverted air portion 4b. These working gases thus have a mixing temperature which is favorable for the gas turbine 8. Otherwise, the same conclusions can be drawn here as those explained with reference to FIG. 2.

Figure 4:
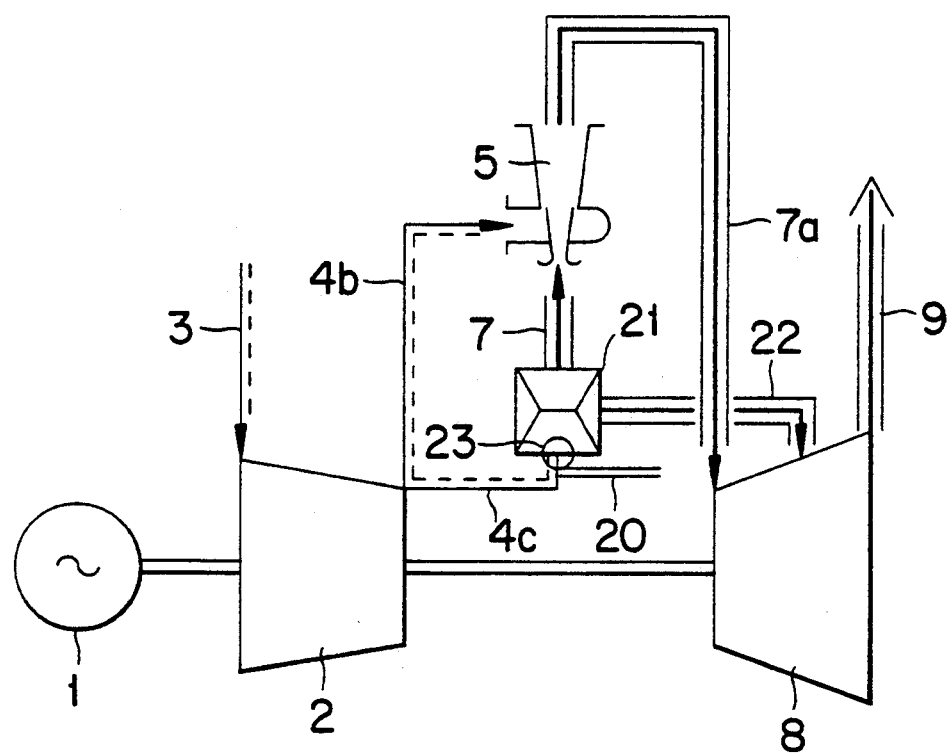

FIG. 4 largely corresponds to the circuit in accordance with FIG. 3, with the difference that the isochoric combustion chamber 21 has two outlets. As a result of the pressure-wave effect, it is thereby possible to achieve better filling of the combustion chambers. This isochoric combustion chamber consists essentially of a cell rotor which is surrounded circumferentially and at the ends by a housing. This housing is connected via at least one channel 23 to the compressor 2. Here too, the precompressed air 4c is treated with a fuel 20 to form a fuel/air mixture prior to entry into the isochoric combustion chamber 21. At the end of the channel 23, this mixture is then introduced into the rotor cells rotating past at that point. As soon as these cells have been filled with the nominal quantity, they pass through a volume-limiting phase, in which the mixture is also ignited. Part of these working gases is admitted as high-pressure gas to the driving nozzle of the injector 5, in the same way as in FIG. 3, and a remaining part 22 is introduced into a low-pressure stage of the gas turbine. As a result, the quantity of residual gas is reduced and the fresh-gas charge increased. By its very nature, an isochoric combustion chamber such as that already shown in FIG. 3 operates as a pressure-wave machine. It can be optimized in this respect. An isochoric combustion chamber need not necessarily have a cell-wheel structure. Other principles are known, for example those with automatic valves.

Resuperheating, which contributes to a greater output of the gas turbine, is preferably provided downstream of the injector 5 in the hot-gas pipe 7a leading to the gas turbine 8 downstream of the injector 5. It is self-evident that the resuperheating postulated here also increases the temperature of the exhaust gases 9, making an expansion of the circuit shown here to a combined process (gas-/steam-turbine process) a genuinely attractive option. A further advantage is also obtained with this resuperheating as regards NOx emissions: the production of NOx from the preceding combustion is greatly reduced in the course of the said resuperheating.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for increasing a pressure drop across a gas turbine group of a power plant comprising the steps of:

compressing air in a compressor portion of said gas turbine group to a first pressure;

directing compressed air having said first pressure from said compressor portion into a mixing nozzle of an injector, said injector being disposed upstream of a fuel injector of a combustion chamber of said gas turbine group;

treating a media in a heat-generating apparatus to provide a treated gas media, wherein the heat-generating apparatus is provided with energy from a waste-gas stream of the gas turbine;

directing said treated gas media to a driving nozzle of said injector;

introducing said treated gas media to said compressed air to thereby further compress said compressed air to a second pressure that is greater than said first pressure; and directing said further compressed air to said combustion chamber.

2. A method for increasing a pressure drop across a gas turbine group as set forth in claim 1, wherein said step of treating a media includes heating feed water in a waste-heat steam generator to provide a treated gas media in the form of high-pressure steam.

3. A method for increasing a pressure drop across a gas turbine group as set forth in claim 2, wherein said further compressed air is directed by said injector to a combustion chamber prior to being directed to said gas turbine portion.

* * * * *